J. S. CLAPPER.
TRACTION MACHINE.
APPLICATION FILED JUNE 3, 1915.

1,178,993.

Patented Apr. 11, 1916.
3 SHEETS—SHEET 1.

WITNESSES

INVENTOR
JOHN S. CLAPPER
BY
ATTORNEYS

J. S. CLAPPER.
TRACTION MACHINE.
APPLICATION FILED JUNE 3, 1915.

1,178,993.

Patented Apr. 11, 1916.
3 SHEETS—SHEET 2.

WITNESSES

INVENTOR
JOHN S. CLAPPER
BY
ATTORNEYS

J. S. CLAPPER.
TRACTION MACHINE.
APPLICATION FILED JUNE 3, 1915.
1,178,993.
Patented Apr. 11, 1916.
3 SHEETS—SHEET 3.
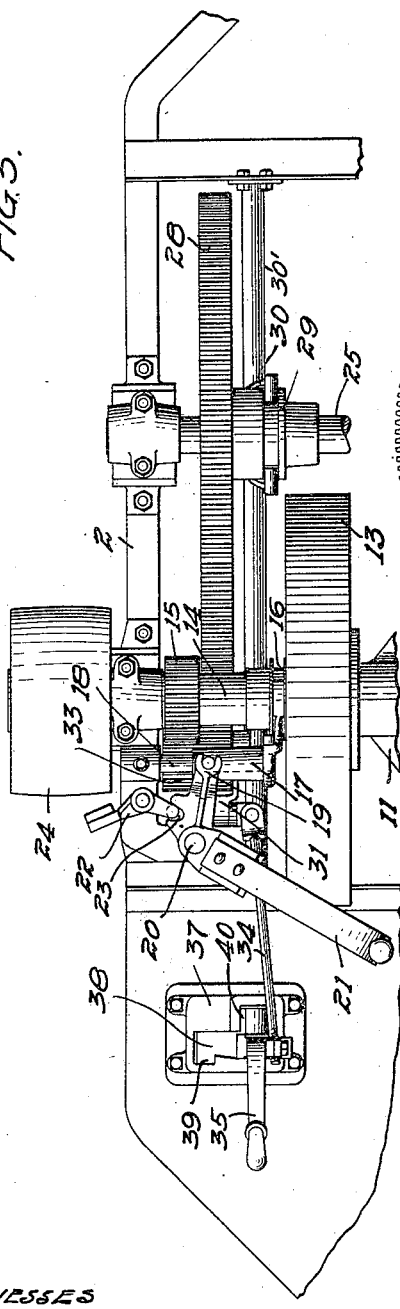
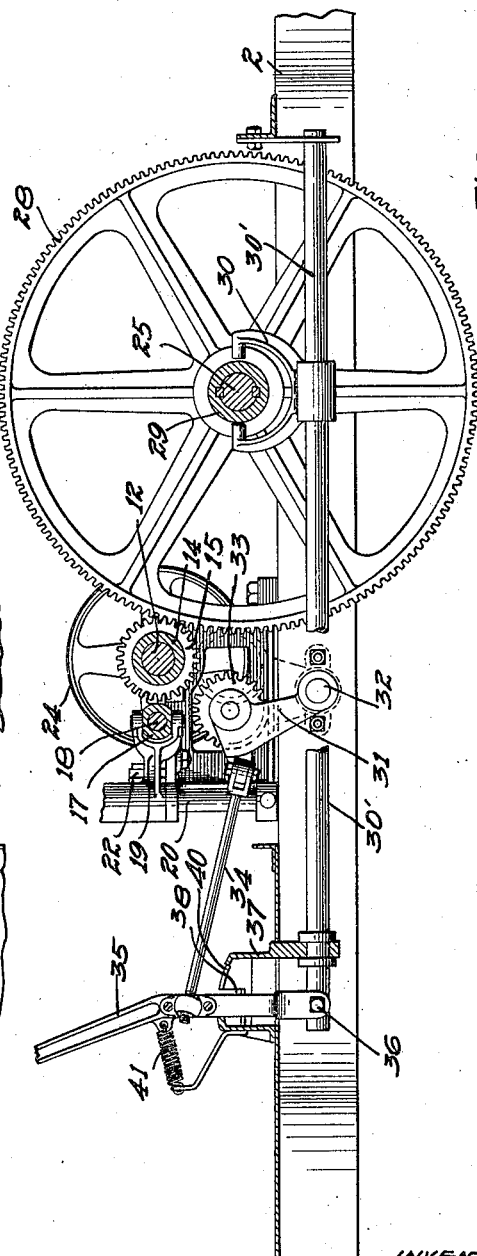
WITNESSES
INVENTOR
JOHN S. CLAPPER
BY
ATTORNEYS

UNITED STATES PATENT OFFICE.

JOHN S. CLAPPER, OF MINNEAPOLIS, MINNESOTA, ASSIGNOR TO BULL TRACTOR COMPANY, OF MINNEAPOLIS, MINNESOTA, A CORPORATION.

TRACTION-MACHINE.

1,178,993. Specification of Letters Patent. Patented Apr. 11, 1916.

Application filed June 3, 1915. Serial No. 31,858.

*To all whom it may concern:*

Be it known that I, JOHN S. CLAPPER, a citizen of the United States, resident of Minneapolis, county of Hennepin, State of Minnesota, have invented certain new and useful Improvements in Traction-Machines, of which the following is a specification.

My invention relates to traction machines designed particularly for use in hauling agricultural implements, particularly plows and the like, and the object of the invention is to provide an improved gear shifting and reversing mechanism and one which can be easily controlled from the driver's seat.

Other objects of the invention will appear from the following detailed description.

The invention consists generally in various constructions and combinations, all as hereinafter described and particularly pointed out in the claims.

Figure 1:
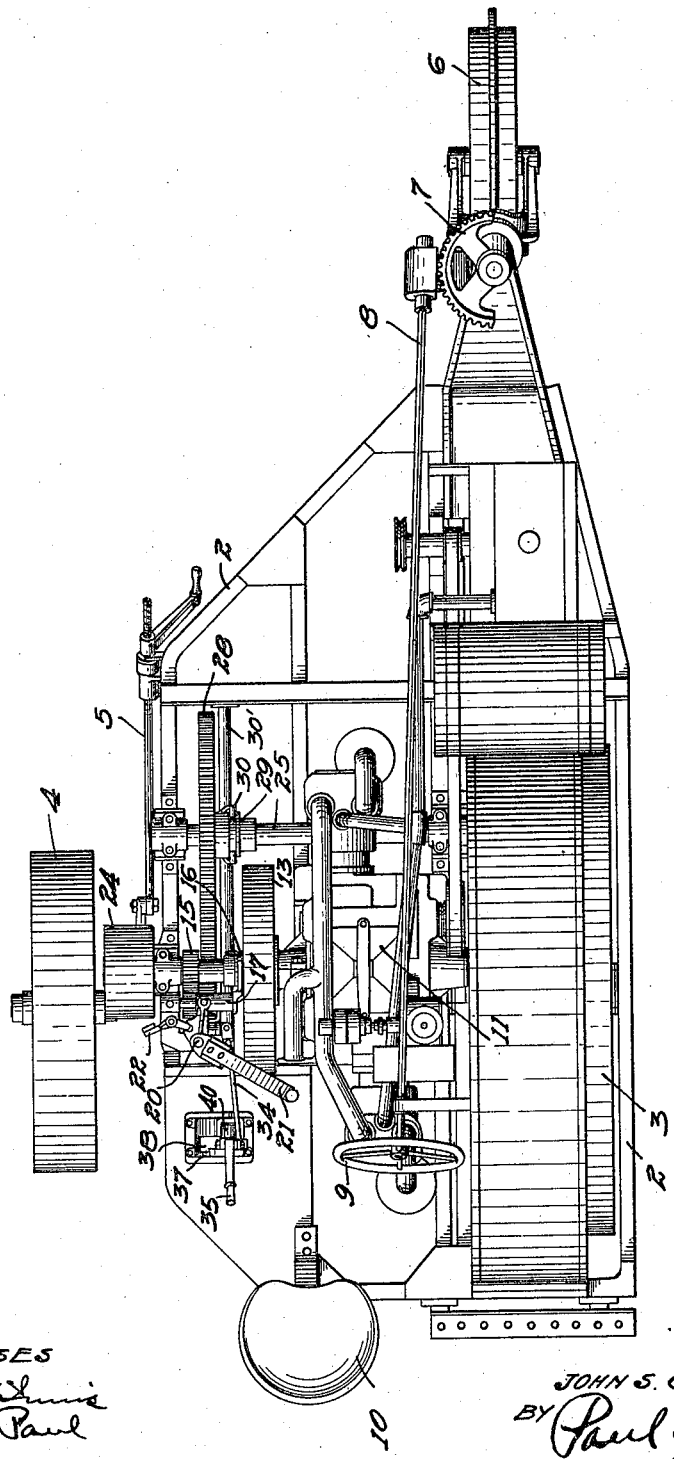
Figure 2:
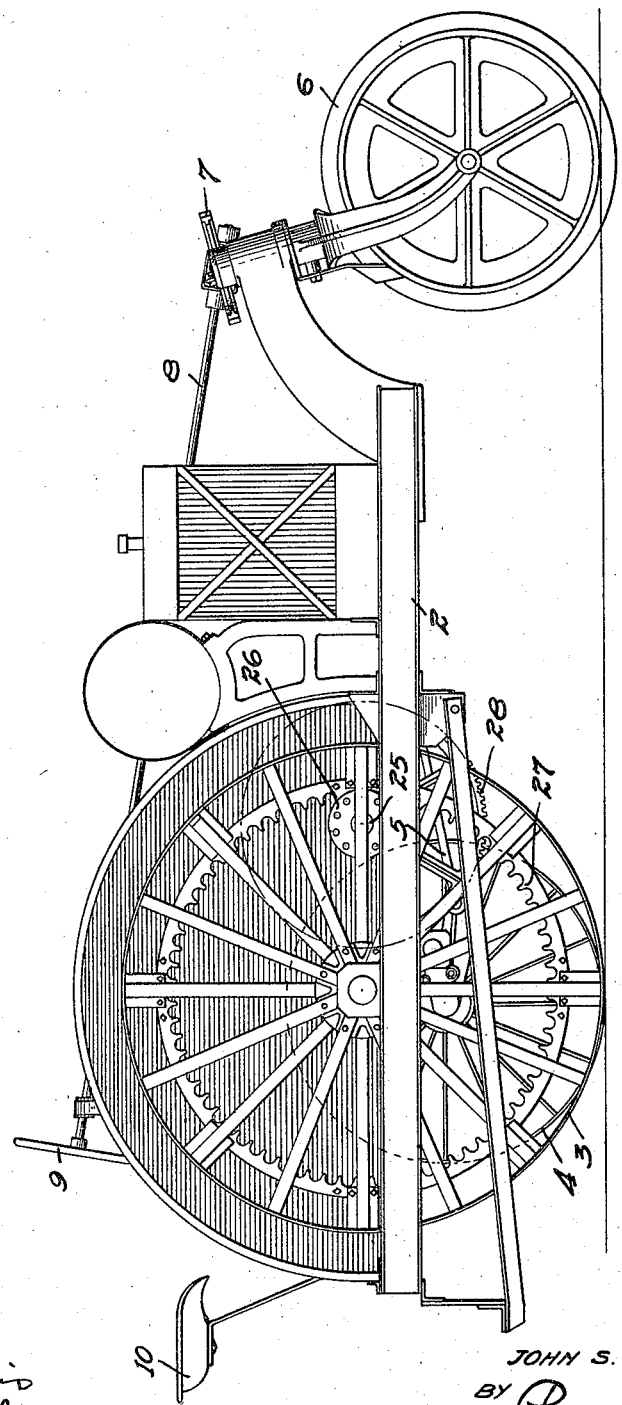

In the accompanying drawings forming part of this specification, Figure 1 is a plan view of a traction machine embodying my invention, Fig. 2 is a side elevation of the same, Fig. 3 is a plan view, showing in detail the gear shifting and reversing mechanism, Fig. 4 is a vertical sectional view through this mechanism.

In the drawing, 2 represents the frame of the machine of any suitable material, preferably channel bar iron.

3 is a traction wheel mounted to travel in the furrow when the machine is used for hauling plows and 4 is an idle carrying wheel arranged opposite to the bull or traction wheel 3 and having a suitable mechanism 5 for adjusting it vertically to compensate for the difference in level of the two wheels when the machine is used for plowing. At the forward portion of the frame is a steering wheel 6 connected through a gear 7 with a steering post 8 having a wheel 9 adjacent to the driver's seat 10.

11 represents an internal combustion engine, mounted preferably near the center of the machine frame and having an extension 12 of its shaft loosely mounted in the fly wheel 13 and provided with a bearing on the machine frame. A sleeve 14 is mounted on said shaft and carries a pinion 15 and the inner end of the sleeve is provided with a clutch member 16 mounted to slide on the sleeve and engage the other member of the clutch on the fly wheel 13 and temporarily lock the sleeve and fly wheel together to revolve the pinion 15. The clutch member 16 is engaged by a fork on a hollow arm 17 slidable on a stem 18 which is engaged by a fork 19 mounted to rotate in a horizontal plane on an upright stud 20 and provided with an operating lever 21. A brake arm 22 is pivoted intermediate to its ends adjacent to the fork 19 and has one end in position to enter a recess 23 in said fork, so that when the lever 21 is operated to separate the members of the clutch, the brake shoe will be thrown into engagement with the surface of a pulley 24 mounted on the outer end of the shaft 12 to which the pinion 15 is secured. A shaft 25 is mounted in the machine frame, parallel with the engine shaft, and is provided with a pinion 26 which meshes with the teeth of a gear ring 27 that is secured to the traction wheel 3. A comparatively large gear wheel 28 is splined on the shaft 25 and has a hub 29 connected through a fork 30 with a rock shaft 30' that is mounted in suitable bearings on the frame transversely of the engine shaft and the shaft 25 and beneath and adjacent thereto. When this shaft is rocked, the fork 30 will be moved also to slide the gear 28 on the shaft into or out of mesh with the pinion 15, thereby transmitting power from the engine to the traction wheel to drive the machine. An arm 31 is pivotally supported at 32 on the frame and carries a wide-faced pinion 33 to engage the pinion 15 and the gear 28 simultaneously. A rod 34 is pivotally connected with said arm at one end and secured to a lever 35 at its opposite end, said lever being mounted at 36 on the rock shaft 30'. A plate 37 is mounted on the machine frame and provided with an L-shaped slot 38 through which the lever 35 projects. This slot preferably has a recess 39 at one end to receive the said lever when it is thrown outwardly to rock the shaft 30' and move the gear 28 into engagement with the teeth of the pinion 15. The extension 40 at the other end of the slot is adapted to receive the lever when it is thrown forward to rock the reversing arm 31 and move the pinion 33 into engagement with the pinion 15 and the gear wheel 28, but it will be noted that the operator, before moving this lever 35 forward, must disengage it from the recess 39 and swing it inwardly to a point opposite the recess 40 and this inward swinging movement of the lever will rock the shaft 30' and disengage the gear 28 from the teeth of the pinion 15 and set it in position to engage the pinion 33 for reverse movement of the machine. A spring 41 is connected with the lever 35 for normally holding it against the rear edge of the L-shaped slot and in the recess 39. It will be noted that the lever 35 cannot be operated to throw in the reverse gear until the gear 28 has been moved to a neutral position. Thus there is no possibility of damage to the gears through the haste of an inexperienced operator. The lever 35 is within convenient reach of the operator of the machine, who can shift the gears, throw them out of or into driving connection with one another and thereby control the operation of the machine.

In various ways the details of construction herein shown and described may be modified and still be within the scope of my invention.

I claim as my invention:

1. A gear shifting and reversing device comprising in combination a sliding gear, a rock shaft mounted to move said gear in either direction, a driving pinion to engage said gear, a swinging arm, a reversing pinion mounted thereon, a lever connected with said rock shaft and with said swinging arm, and a guiding plate having an L-shaped slot therein through which said lever extends, lateral movement of said lever shifting said gear and forward movement thereof at one end of said slot moving said reversing pinion into engagement with said driving pinion and said gear.

2. A gear shifting and reversing device comprising in combination a shaft, a sliding gear thereon, a rock shaft mounted transversely of said gear shaft and operatively connected with said gear to move it back and forth on said gear shaft, a driving pinion with which said gear engages, an engine shaft, a fly wheel having a clutch connection with said driving pinion, a lever mounted to swing in a horizontal plane for operating said clutch connection, a reversing pinion mounted to engage with said driving pinion and said gear only when said gear is out of mesh with said driving pinion, an operating lever connected with said rock shaft and with said reversing pinion and having a lateral movement to rock said shaft and a forward and backward movement to operate said reversing pinion, and a guide having means at one end for locking said lever against premature lateral movement and its opposite end having means for allowing forward or backward movement of said lever.

3. A gear shifting and reversing device comprising a single sliding gear, a driving pinion with which said gear is mounted to engage, a clutch for rendering said pinion operative or inoperative, an arm mounted to oscillate on a vertical pivot and having means for engaging said clutch, an operating lever for said arm, a reversing pinion mounted to engage said pinion and said gear only when said gear is out of mesh with said driving pinion, and a control lever having means for operating said sliding gear and connected with said reversing pinion for moving them successively.

4. A gear shifting and reversing device comprising in combination a sliding gear, a driving pinion to engage said gear, a reversing pinion, a control lever, a guide plate having a slot therein wherein said control lever is movable, mechanism connecting said lever with said gear and with said reversing pinion, lateral movement of said lever in said guide moving said gear back and forth into and out of engagement with said driving pinion and forward and backward movement of said lever at one end of said guide operating said reversing pinion.

In witness whereof, I have hereunto set my hand this 28th day of May 1915.

JOHN S. CLAPPER.

Copies of this patent may be obtained for five cents each, by addressing the "Commissioner of Patents Washington, D. C."